United States Patent
Sudarsanam et al.

(10) Patent No.: US 9,529,808 B1
(45) Date of Patent: Dec. 27, 2016

(54) EFFICIENT AND FLEXIBLE ORGANIZATION AND MANAGEMENT OF FILE METADATA

(71) Applicant: Tintri Inc., Mountain View, CA (US)

(72) Inventors: Raj A. Sudarsanam, Fremont, CA (US); Pratap V. Singh, Mountain View, CA (US); Edward K. Lee, Walnut Creek, CA (US); Mark G. Gritter, Eagan, MN (US); Rose F. Liu, Sunnyvale, CA (US)

(73) Assignee: Tintri Inc., Mountain View, CA (US)

( * ) Notice: Subject to any disclaimer, the term of this patent is extended or adjusted under 35 U.S.C. 154(b) by 349 days.

(21) Appl. No.: 13/938,005

(22) Filed: Jul. 9, 2013

Related U.S. Application Data

(60) Provisional application No. 61/672,165, filed on Jul. 16, 2012.

(51) Int. Cl.
*G06F 7/00* (2006.01)
*G06F 17/00* (2006.01)
*G06F 17/30* (2006.01)

(52) U.S. Cl.
CPC ............... *G06F 17/30088* (2013.01)

(58) Field of Classification Search
CPC .................................. G06F 17/30088
USPC ........................................ 707/649
See application file for complete search history.

(56) References Cited

U.S. PATENT DOCUMENTS

| | | | |
|---|---|---|---|
| 6,526,574 B1 | 2/2003 | Jones | |
| 6,594,744 B1 | 7/2003 | Humlicek et al. | |
| 7,809,759 B1 | 10/2010 | Bruso et al. | |
| 8,463,825 B1 | 6/2013 | Harty et al. | |
| 8,612,488 B1 | 12/2013 | Subramanya et al. | |
| 2003/0120863 A1 | 6/2003 | Lee et al. | |
| 2004/0030727 A1* | 2/2004 | Armangau | G06F 11/1435 |
| 2004/0267836 A1 | 12/2004 | Armangau et al. | |
| 2005/0188049 A1 | 8/2005 | Perret et al. | |
| 2006/0112151 A1 | 5/2006 | Manley et al. | |
| 2006/0235892 A1* | 10/2006 | Kalach | G06F 11/3409 |
| 2007/0043574 A1 | 2/2007 | Coffman et al. | |
| 2007/0055833 A1 | 3/2007 | Vu et al. | |
| 2007/0106706 A1* | 5/2007 | Ahrens | G06F 17/30088 |
| 2007/0208918 A1 | 9/2007 | Harbin et al. | |
| 2007/0260830 A1 | 11/2007 | Faibish et al. | |
| 2007/0271365 A1 | 11/2007 | Revanuru et al. | |
| 2007/0283111 A1 | 12/2007 | Berkowitz et al. | |

(Continued)

OTHER PUBLICATIONS

Author Unknown, "NetApp SnapRestore software uses stored Snapshot copies to recover entire file systems or data volumes in seconds.", http://www.netapp.com/us/products/protection-software/snaprestore.aspx.

(Continued)

*Primary Examiner* — Van Oberly
(74) *Attorney, Agent, or Firm* — Van Pelt, Yi & James LLP

(57) ABSTRACT

Storing data is disclosed, including: receiving a request to create a clone of a snapshot included in a first set of metadata associated with a source data; and generating a second set of metadata for the clone, wherein the second set of metadata associated with the clone includes, for at least some metadata values, a data associating with the second set of metadata one or more corresponding values in the first set of metadata associated with the source data.

23 Claims, 14 Drawing Sheets

(56) References Cited

U.S. PATENT DOCUMENTS

| | | | |
|---|---|---|---|
| 2008/0082593 A1 | 4/2008 | Komarov et al. | |
| 2008/0155223 A1 | 6/2008 | Hiltgen et al. | |
| 2008/0244028 A1 | 10/2008 | Le et al. | |
| 2009/0260007 A1* | 10/2009 | Beaty | G06F 9/5077 718/1 |
| 2009/0307450 A1* | 12/2009 | Lee | G06F 3/0605 711/162 |
| 2010/0070726 A1 | 3/2010 | Ngo et al. | |
| 2010/0257403 A1 | 10/2010 | Virk et al. | |
| 2011/0035359 A1 | 2/2011 | Bendakovsky et al. | |
| 2011/0153697 A1 | 6/2011 | Nickolov et al. | |
| 2012/0323853 A1* | 12/2012 | Fries | G06F 11/301 707/649 |
| 2013/0262801 A1 | 10/2013 | Sancheti et al. | |

OTHER PUBLICATIONS

Author Unknown, "rysnc—Wikipedia", accessed Jul. 23, 2013 version on Nov. 5, 2014 via the Internet Wayback Machine, https://web.archive.org/web/20120619201533/http://en.wikipedia.org/wiki/Rsync.

Martin Pool, "rdiff(1)—Linkux man page", accessed Jun. 29, 2012 version on Nov. 5, 2014 via the Internet Wayback Machine, https://web.archive.org/web/20120629053647/http://linux.die.net/man/1/rdiff.

Ben Escoto "rdiff-backup(1)—Linux man page", accessed Jul. 5, 2012 version on Nov. 5, 2014 via the Internet Wayback Machine, https://web.archive.org/web/20120705001700/http://linux.die.net/man/1/rdiff-backup.

Laverick et al., "Administering VMware View™ 4.5", Jan. 1, 2010, Retrieved from the Internet: URL: http://cdn.ttgtmedia.com/rms/pdf/view4.5-rtfm-guide-GAAE-1.pdf [retrieved on Aug. 5, 2016].

Ohad Rodeh, "B-trees, shadowing, and clones", ACM Transactions on Storage, vol. 3, No. 4, pp. 1-27, Feb. 1, 2008.

"Data Synchronization", Aug. 8, 2016, Wikipedia, en.wikipedia.org/wiki/Data_synchronization.

"Data Synchronization", Aug. 8, 2016, Techopedia, www.techopedia.com/definition/1006/data-synchornization.

* cited by examiner

EFFICIENT AND FLEXIBLE ORGANIZATION AND MANAGEMENT OF FILE METADATA

CROSS REFERENCE TO OTHER APPLICATIONS

This application claims priority to U.S. Provisional Patent Application No. 61/672,165 entitled EFFICIENT AND FLEXIBLE ORGANIZATION AND MANAGEMENT OF FILE METADATA filed Jul. 16, 2012 which is incorporated herein by reference for all purposes.

BACKGROUND OF THE INVENTION

The organization of file system metadata has important consequences for the efficiency and flexibility of storage management operations such as snapshotting and cloning. Snapshotting creates point-in-time read-only copies of a file, while cloning creates writable copies of a file. Early implementations of snapshots and clones essentially copied all file data as well as metadata. More recently, especially using techniques such as deduplication, it is more common to simply copy or manipulate metadata without having to copy the data. Some common approaches used recently include: copying all file metadata for each snapshot or clone and breaking up metadata into pages that are initially shared and performing copy-on-write, or creating new versions of metadata when they are modified.

BRIEF DESCRIPTION OF THE DRAWINGS

Various embodiments of the invention are disclosed in the following detailed description and the accompanying drawings.

DETAILED DESCRIPTION

Figure 1:
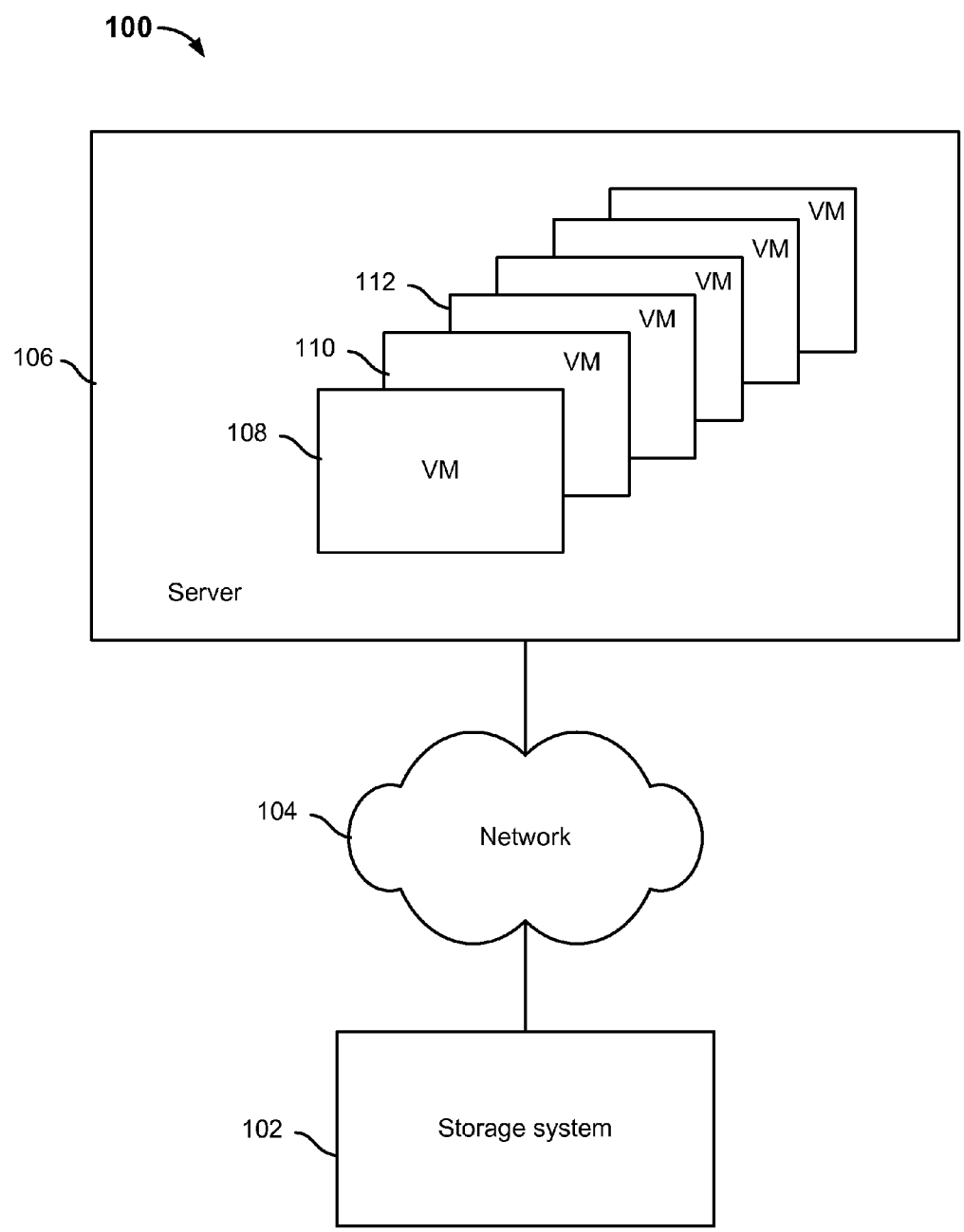
FIG. 1 is a diagram showing an embodiment of a storage system for the storage of VMs using virtual machine storage abstractions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of generating a clone of a set of data are described herein. A set of data is associated with a set of metadata that maps to locations in storage to which the data is stored. A set of data may be associated with a virtual machine (also sometimes referred to as a VM), a virtual disk (also sometimes referred to as a vdisk), or a file, for example. In various embodiments, metadata includes at least a series of snapshots associated with the set of data. A snapshot comprises a point-in-time copy of the set of data and in various embodiments, a subsequently generated snapshot includes mappings to data that was modified since the previous snapshot was created. In various embodiments, a "clone" refers to a copy of an existing set of data (or the existing set of data is sometimes referred to as "source data"). In various embodiments, a clone is generated from a snapshot of the source data. To generate the clone, a new set of metadata is created and data associating the clone's new set of metadata to the source data's set of metadata is stored such that at least some of the metadata associated with the source data is to be shared with the new set of metadata associated with the clone.

In various embodiments, the metadata comprises one or more indices. For example, a snapshot comprises an index. A "user" performs read and write operations using "logical offsets," which are mapped to "physical offsets" using such an index. The physical offsets can then be used to read and write data from the underlying physical storage devices. Read operations lookup the logical offset in an index to find the corresponding physical offset, while write operations create new entries or update existing entries in an index.

FIG. 1 is a diagram showing an embodiment of a storage system for the storage of VMs using virtual machine storage abstractions. In the example shown, system 100 includes server 106, network 104, and storage system 102. In various embodiments, network 104 includes various high-speed data networks and/or telecommunications networks. In some embodiments, storage system 102 communicates with server 106 via network 104. In some embodiments, the file system for the storage of VMs using virtual machine storage abstractions does not include network 104, and storage system 102 is a component of server 106. In some embodiments, server 106 is configured to communicate with more storage systems other than storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of virtual machine storage abstractions. In some embodiments, the respective files associated with (at least) VMs 108, 110, and 112 running on server 106 are stored on storage system 102.

In various embodiments, storage system 102 is configured to store meta-information identifying which stored data objects, such as files or other virtual machine storage abstractions, are associated with which VM or vdisk. In various embodiments, storage system 102 stores the data of VMs running on server 106 and also stores the metadata that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 102 refers to one or more physical systems and/or associated hardware and/or software components configured to work together to store and manage stored data, such as files or other stored data objects. In some embodiments, a hardware component that is used to (at least in part) implement the storage system may be comprised of either disk or flash, or a combination of disk and flash.

Figure 2:
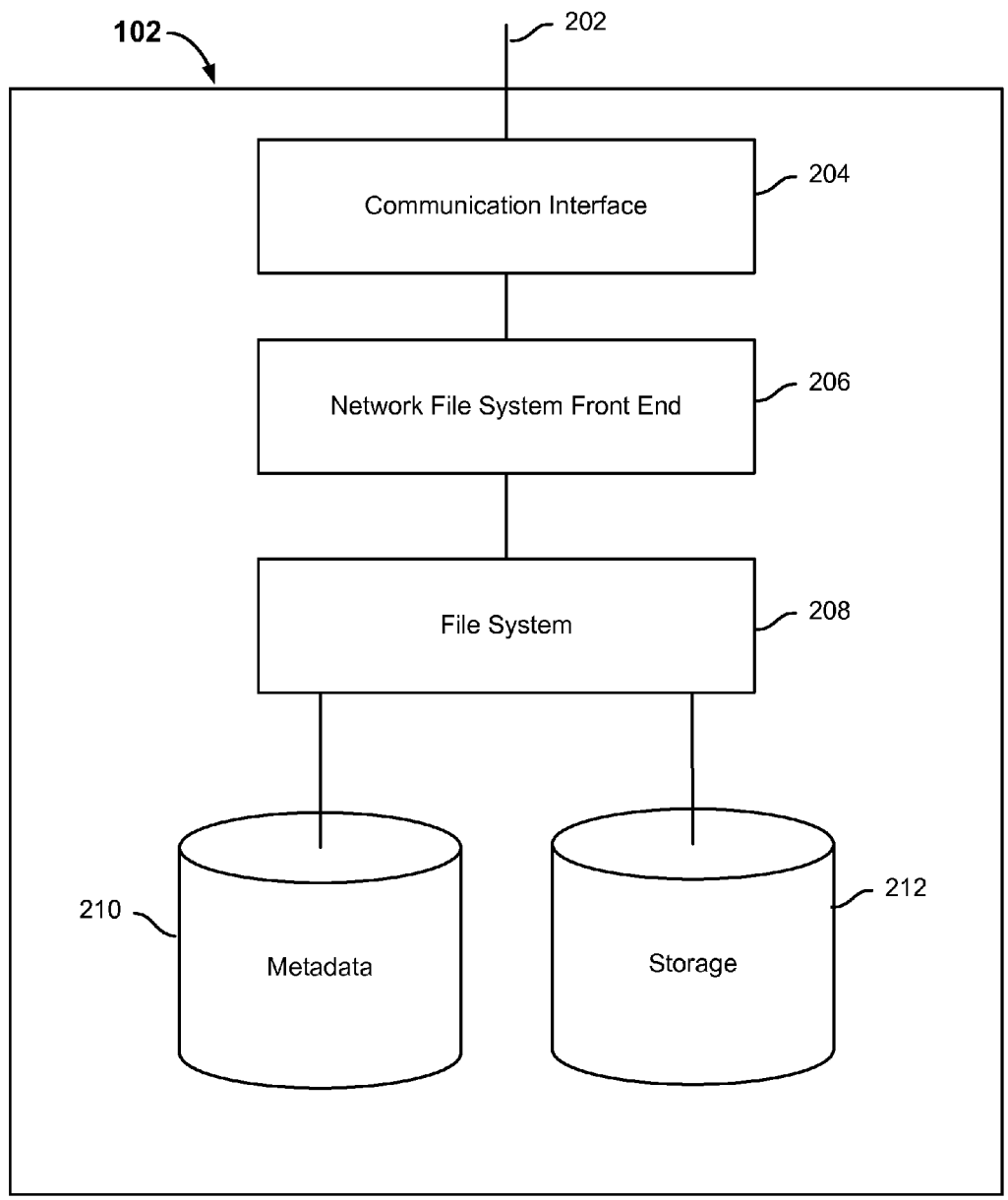
FIG. 2 is a block diagram illustrating an embodiment of a storage system including data and metadata.

FIG. 2 is a block diagram illustrating an embodiment of a storage system including data and metadata. In the example shown, storage system 102 includes a network connection 202 and a communication interface 204, such as a network interface card or other interface, which enable the storage system to be connected to and communicate via a network such as network 104 of FIG. 1. The storage system 102 further includes a network file system front end 206 configured to handle NFS requests from virtual machines running on systems such as server 106 of FIG. 1. In various embodiments, the network file system front end is configured to associate NFS requests as received and processed with a corresponding virtual machine and/or vdisk with which the request is associated, for example, using meta-information stored on storage system 102 or elsewhere. The storage system 102 includes a file system 208 configured and optimized to store VM data. In the example shown, metadata 210 comprises a database (or multiple databases) that is configured to store sets of metadata associated with various sets of data. For example, a set of metadata may be associated with a VM, a vdisk, or a file. Storage 212 may comprise at least one tier of storage. In some embodiments, storage 212 may comprise at least two tiers of storage, where the first tier of storage comprises flash or other solid state disk (SSD) and the second tier of storage comprises a hard disk drive (HDD) or other disk storage. In various embodiments, a set of metadata stored at metadata 210 includes at least one index that includes mappings to locations in storage 212 at which a set of data (e.g., VM, vdisk, or file) associated with the set of metadata is stored. In some embodiments, a set of metadata stored at metadata 210 includes at least an index that is a snapshot associated with a set of data stored in storage 212.

A clone may be generated based on an existing (or source) set of data stored in storage 212. In various embodiments, the clone may be generated using a snapshot of the source set of data in the source data's set of metadata that is stored in metadata 210. In various embodiments, the snapshot of the source data from which a clone is generated is referred to as a "shared snapshot." A new set of metadata is created for the clone and data associating the clone (and/or the clone's set of metadata) with the set of metadata associated with the source data is stored at metadata 210. At least some of the metadata associated with the source data is shared with the clone. As will be described in further detail below, when a received request includes an operation (e.g., read or write) to access (e.g., a current state or to a past state of) data from a set of data (e.g., a VM, a vdisk, or a file), the set of metadata associated with that data is retrieved. In the event that the data associated with the request comprises a clone, then in some instances, at least a portion of the set of metadata associated with the source data may be accessed as well.

In various embodiments, a snapshot of a set of data may be synchronized to another set of data such that subsequent to the synchronization process, the current state of the other set of data reflects that of the snapshot. In various embodiments, even after synchronization, the identity (e.g., the series of snapshots and any labels) that is associated with the set of data that has been synchronized to the snapshot is preserved.

Figure 3:
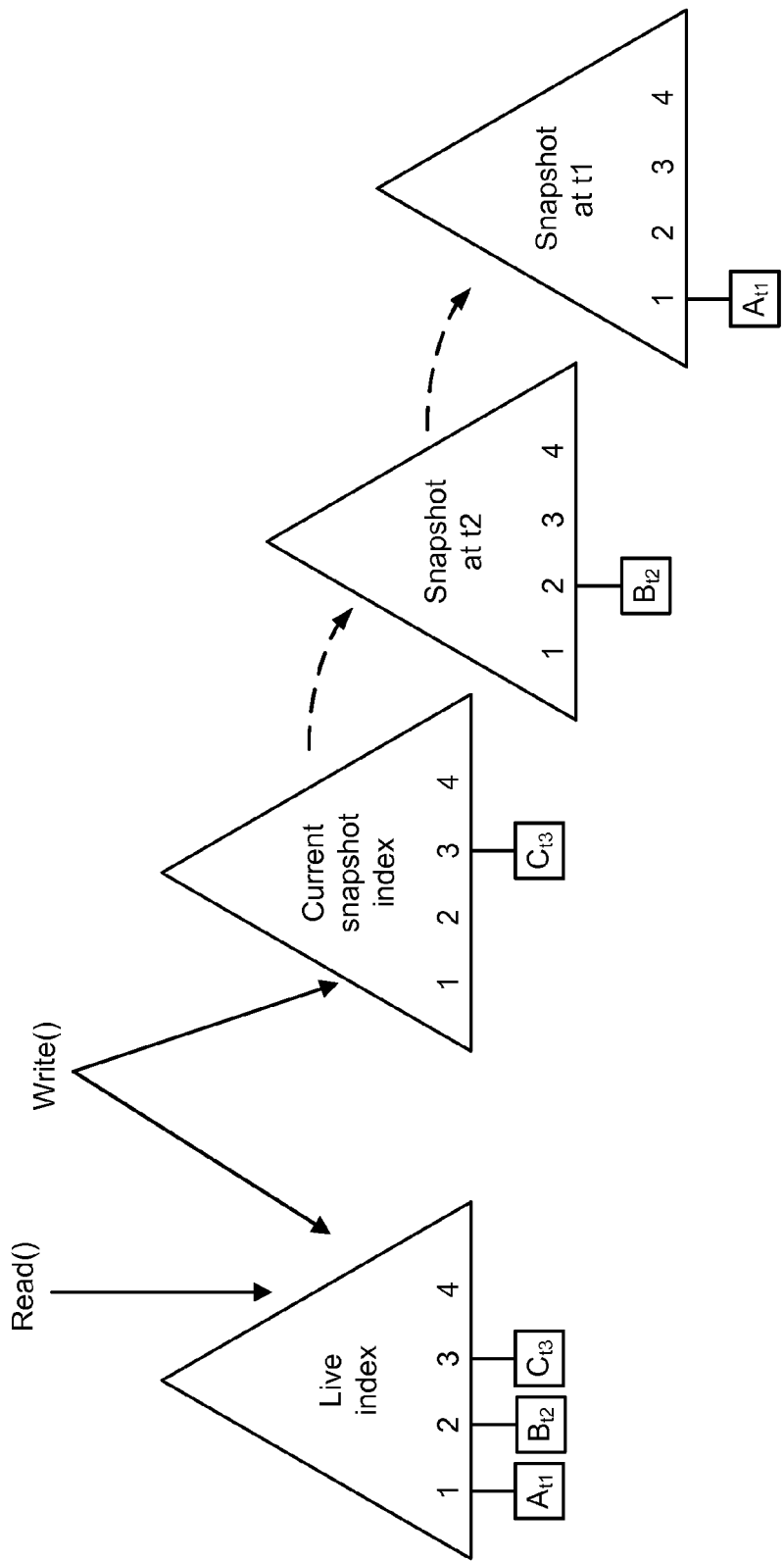
FIG. 3 is a diagram showing an example of a set of metadata associated with a set of data.

FIG. 3 is a diagram showing an example of a set of metadata associated with a set of data. In the example, the set of metadata may be associated with a file. In the example, the set of metadata includes a live index, a current snapshot index, a snapshot at time t2, and a snapshot at time t1. In the example, data associated with the file may be stored at locations 1, 2, 3, and 4.

Metadata may be thought of as the mapping used to translate a logical location (e.g., a logical offset) to a physical location (e.g., a physical offset) for data that a user may have written. In various embodiments, the metadata may be organized as an efficient index data structure such as a hash table or a B-tree. For example, the relationship between a logical offset of a data, the index, and the physical offset of the data may be described as follows: logical-offset INDEX physical-offset.

In various embodiments, each set of metadata includes two active indices: the "live index" and "current snapshot index." The live index and the current snapshot index are active in the sense that they can be modified. In some embodiments, the live index stores all offsets that are currently mapped in the file, while the current snapshot index stores all offsets in the file that have been mapped since the previous snapshot was created. Put another way, the live index acts as a cache of all the mappings for the current state of the file. A snapshot is typically a read-only file, but the current snapshot index is modifiable until the next prescribed snapshot creation event occurs. For example, a prescribed snapshot creation event may be configured by a user and may comprise the elapse of an interval of time, the detection of a particular event, or a receipt of a user selection to create a new snapshot. Once the next prescribed snapshot creation event is reached, the state of the current snapshot index is preserved to create a new snapshot and a new empty current snapshot index is created. In some embodiments, write operations to the set of data result in the update of both the live and current indices. In some embodiments, read operations of the current state of the set of data result in the search of only the live index. Read operations of a past state of the set of data result in a search through the series of snapshots. In various embodiments, each index is searched in a prescribed manner.

In some embodiments, a snapshot of a file is the point-in-time state of the file at the time the snapshot was created. A snapshot of a VM is the collection of file-level snapshots of files that comprise the VM. In some embodiments, a snapshot is represented as an index that stores mappings to the data that was modified after the previous snapshot was created. In other words, in some embodiments, each snapshot only includes the updates to a file (i.e., deltas) for a given time period (since the creation of the previous snapshot). As a result, the snapshot may be represented by a compact space-efficient structure.

As mentioned above, when a snapshot is created, the current snapshot index becomes the index of the snapshot, and a new empty current snapshot index is created in preparation for the next snapshot. Each snapshot is linked to the next younger and next older snapshot. In some embodiments, the links that go backward in time (i.e., the links to the next older snapshots) are traversed during snapshot and clone read operations.

Returning to the example of FIG. 3, the current snapshot index is linked (e.g., points to) the snapshot at time t2 and the snapshot at time t2 is linked to the snapshot at time t1. Read operations to the current state of the file are serviced from the live index, while write operations to the file update both the live and current snapshot indices. In the example of FIG. 3, data A is written at time t1 at location 1 and then the snapshot at time t1 is created. The data B is written at time t2 at location 2 and then the snapshot at time t2 is created. The data C is written at time t3 at location 3 and tracked in the current snapshot index. The live index tracks the current state of the data of the file at each of the locations 1, 2, 3, and 4 and may be updated each time that data is written to a location associated with the file. As such, the live index includes data A at location 1, data B at location 2, data C at location 3, and no data at location 4 because data has not been written to the file at location 4. For example, if a new data D (not shown) is to overwrite the data currently at location 3, data C, at time t4, then location 3 of the current snapshot index would be updated to map to data D and location 3 of the live index would also be updated to map to data D.

In various embodiments, a read operation on a specified snapshot for a logical block offset may proceed in the following manner: First, a lookup of the specified snapshot index is performed for the logical block offset of the read operation. If a mapping exists, then data is read from the physical device at the corresponding physical address and returned. Otherwise, if the mapping does not exist within the specified snapshot index, the link to the next older snapshot is traversed and a search of this older snapshot's index is performed. This process continues until a mapping for the logical block offset is found in a snapshot index or the last snapshot in the chain has been examined.

The use of the live index greatly enhances the efficiency of reading the current state of the file. To illustrate this, first assume that the live index of FIG. 3 is not used. In a first example of performing a read operation without using the live index of FIG. 3, we attempt to perform a read operation to access the current data associated with location 1. First, a lookup of a mapping to the data associated with location 1 is performed in the current snapshot index. However, such a mapping is not found in the current snapshot index and so the link to the next older snapshot, the snapshot at time t2, is traversed and a search for the mapping to data associated with location 1 is performed. Again, such a mapping is not found in the snapshot at time t2 and so the link to the next older snapshot, the snapshot at time t1, which is also the last snapshot in the chain, is traversed and a search for the mapping to data associated with location 1 is performed. The data associated with location 1, data A, is found in snapshot t1 and data A is accessed to complete the read operation. As described in this example, without using the live index, the data associated with location 1 was found after the expensive traversals from the current snapshot index, to the snapshot at time t2, and then to the snapshot at time t1. However, if the live index of FIG. 3 is used, then a search for the data associated with location 1 may be first performed in the live index. Using the live index, data A associated with location 1 is quickly located without needing to perform any traversals between indices.

In a second example of performing a read operation without using the live index of FIG. 3, we attempt to perform a read operation to access the current data associated with location 4. First, a lookup of a mapping to the data associated with location 4 is performed in the current snapshot index. However, such a mapping is not found in the current snapshot index and so the link to the next older snapshot, the snapshot at time t2, is traversed and a search for the mapping to data associated with location 4 is performed. Again, such a mapping is not found in the snapshot at time t2 and so the link to the next older snapshot, the snapshot at time t1, which is also the last snapshot in the chain, is traversed and a search for the mapping to data associated with location 4 is performed. Yet again, such a mapping is not found in the snapshot at time t1 and so a message that indicates that no data is stored for location 4 is returned for the read operation. As described in this example, without using the live index, the data associated with location 4 was not located even after the expensive traversals from the current snapshot index all the way to the last snapshot in the chain, the snapshot at time t1. However, if the live index of FIG. 3 is used, then a search for the data associated with location 4 may be first performed in the live index. Using the live index, it is quickly apparent that no data has been stored for location 4 and therefore an appropriate message can be returned for the read operation without needing to perform any costly traversals between indices. An example in which a read operation may attempt to read data from a location for which no data has been stored is in a distributed system in which a first node may attempt to read data at a location associated with a second node and unbeknownst to the first node, the second node never stored any data at that location.

Figure 4:
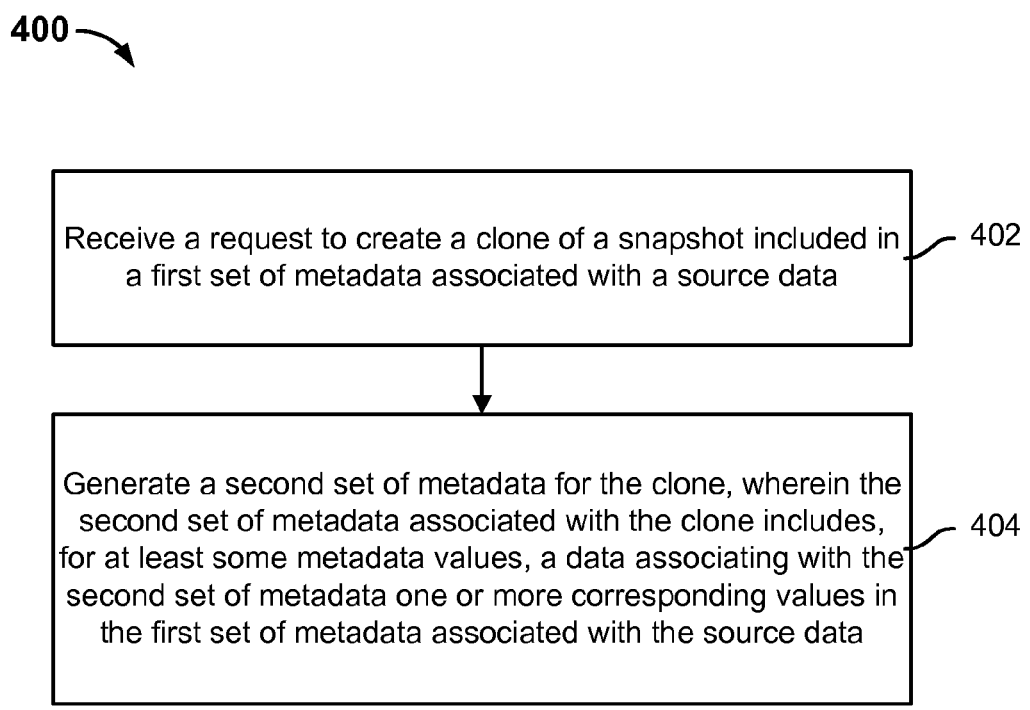
FIG. 4 is a flow diagram showing an embodiment of a process for generating a clone.

FIG. 4 is a flow diagram showing an embodiment of a process for generating a clone. In some embodiments, the process 400 is performed wholly or partly by a storage system and/or other processing system, for example, one configured to execute computer instructions that implement the steps of process 400.

At 402, a request to create a clone of a snapshot included in a first set of metadata associated with a source data is received. For example, users may not write to snapshots directly. Instead, clones are to be created from the snapshots and then read and write operations may be applied directly to the clones. A clone is created from a snapshot of a source data. This snapshot of the source data is sometimes referred to as a shared snapshot, to indicate that it is shared among the source data and at least one clone. One or more other clones may also be created from the shared snapshot of the source data.

In some embodiments, the shared snapshot from which a clone is to be created may be selected by the user. In some embodiments, a current snapshot index may be selected to create a clone from. In the event that the current snapshot index is selected, then a non-active, read-only snapshot may be created from the current snapshot index and used to create a clone.

At 404, a second set of metadata is generated for the clone, wherein the second set of metadata associated with the clone includes, for at least some metadata values, a data associating with the second set of metadata one or more corresponding values in the first set of metadata associated with the source data. In various embodiments, at least one of a live index and a current snapshot index is created for the clone. The newly created live index is empty and information associating the clone's live index and the shared snapshot of the source data is stored. The newly created live index for the clone will remain empty until new data, or data to overwrite existing data associated with the source data, is written to the clone. As will be described in further detail below, in various embodiments, at least the shared snapshot of the source data is shared with the clone such that a read operation on the clone may cause data to be read starting from the shared snapshot.

Figure 5:
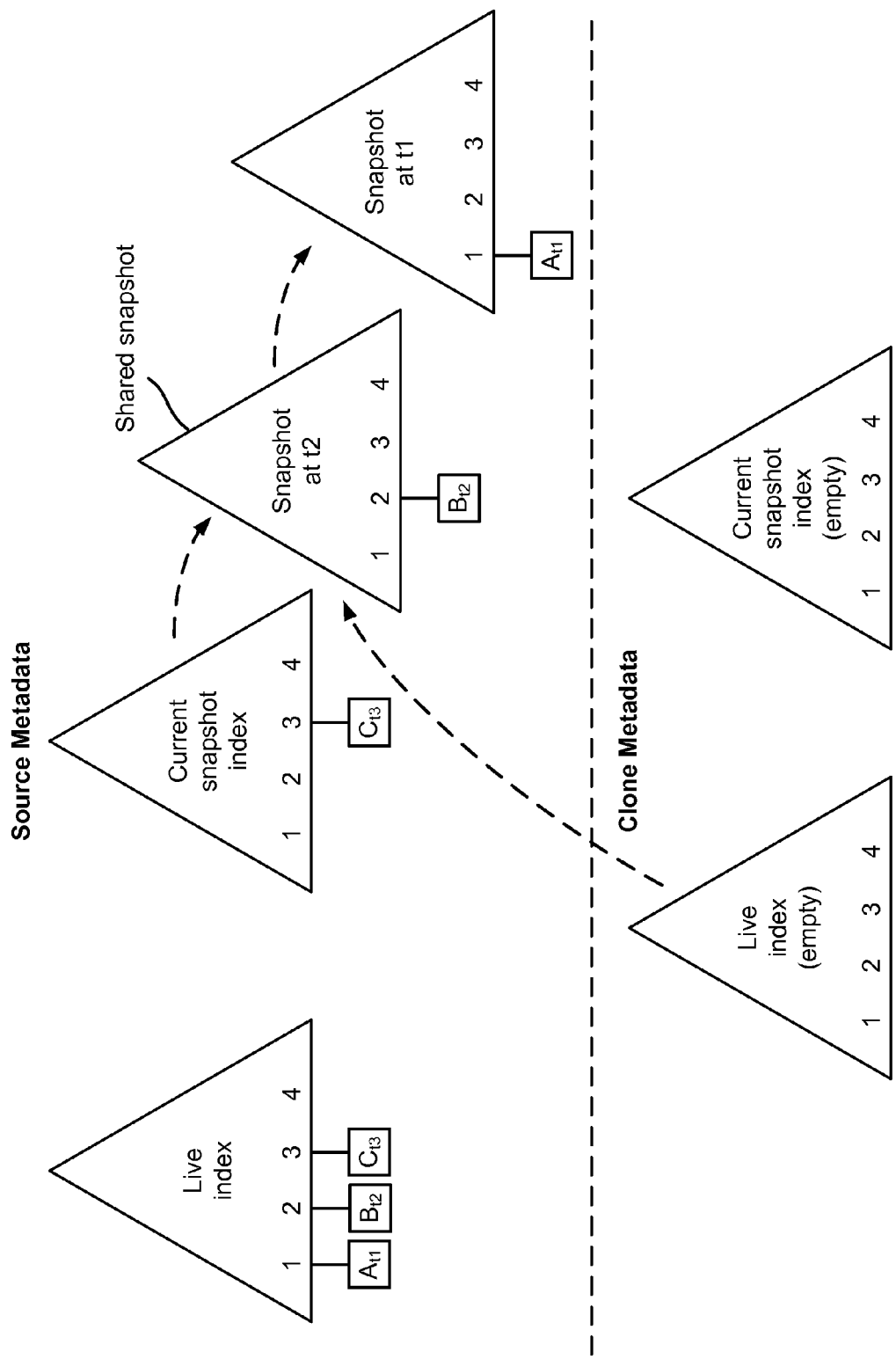
FIG. 5 is a diagram showing an example of a set of metadata associated with source data and a set of metadata associated with a clone.

FIG. 5 is a diagram showing an example of a set of metadata associated with source data and a set of metadata associated with a clone. In some embodiments, a clone may be created from either a set of data or from an existing snapshot of a set of data. In the example, a snapshot of the source data was first created, then a clone was created from this snapshot. As previously described, in order to reduce metadata and data space consumption, snapshots are represented in a compact format that only stores the changes that have been made to the associated set of data since the previous snapshot was created. The set of metadata associated with the source data (the source metadata) includes a live index, a current snapshot index, a snapshot at time t2, and a snapshot at time t1. In the example, the clone is created from the snapshot at time t2 of the source metadata. Therefore, the snapshot at time t2 is now also referred to as a shared snapshot because it is now shared between the source data and its clone. While not shown in the example, one or more other clones besides the one shown may be created from the snapshot at time t2 of the source metadata. In some embodiments, each snapshot has an associated reference count that tracks the total number of clones that have been created from the snapshot. After a clone creation operation has completed, the reference count of the shared snapshot is incremented by the number of new clones that were created from the snapshot. When a clone is deleted, the reference count associated with the shared snapshot from which the clone was created is decremented by one. As will be described in further detail below, the reference count of a shared snapshot is considered when it is determined whether the shared snapshot should be deleted. For example, a snapshot cannot be deleted if it has a non-zero reference count, thus preserving the data shared by the clones.

In various embodiments, creating clones (e.g., of snapshots of VMs) does not require copying metadata and/or data. Instead, a new empty live index and a current snapshot index are created for each clone. Furthermore, information associating the live index of each clone with the shared snapshot of the source data is stored. The information associating the live index of the clone with the shared snapshot may be stored with the clone metadata, the source metadata, or elsewhere. For example, the associating data is a pointer or another type of reference that the live index of each clone can use to point to the index of the shared snapshot from which the clone was created. This link to the shared snapshot is traversed during reads of the clone as will be described in further detail below. As shown in the example of FIG. 5, an empty live index and an empty current snapshot index are created for the new clone. The live index of the clone points back to the shared snapshot of the source data, the snapshot at time t2. The live index and the current snapshot index of the clone will remain empty until new data is written to the clone or existing data of the source data is modified for the clone, as will be described below.

Figure 6:
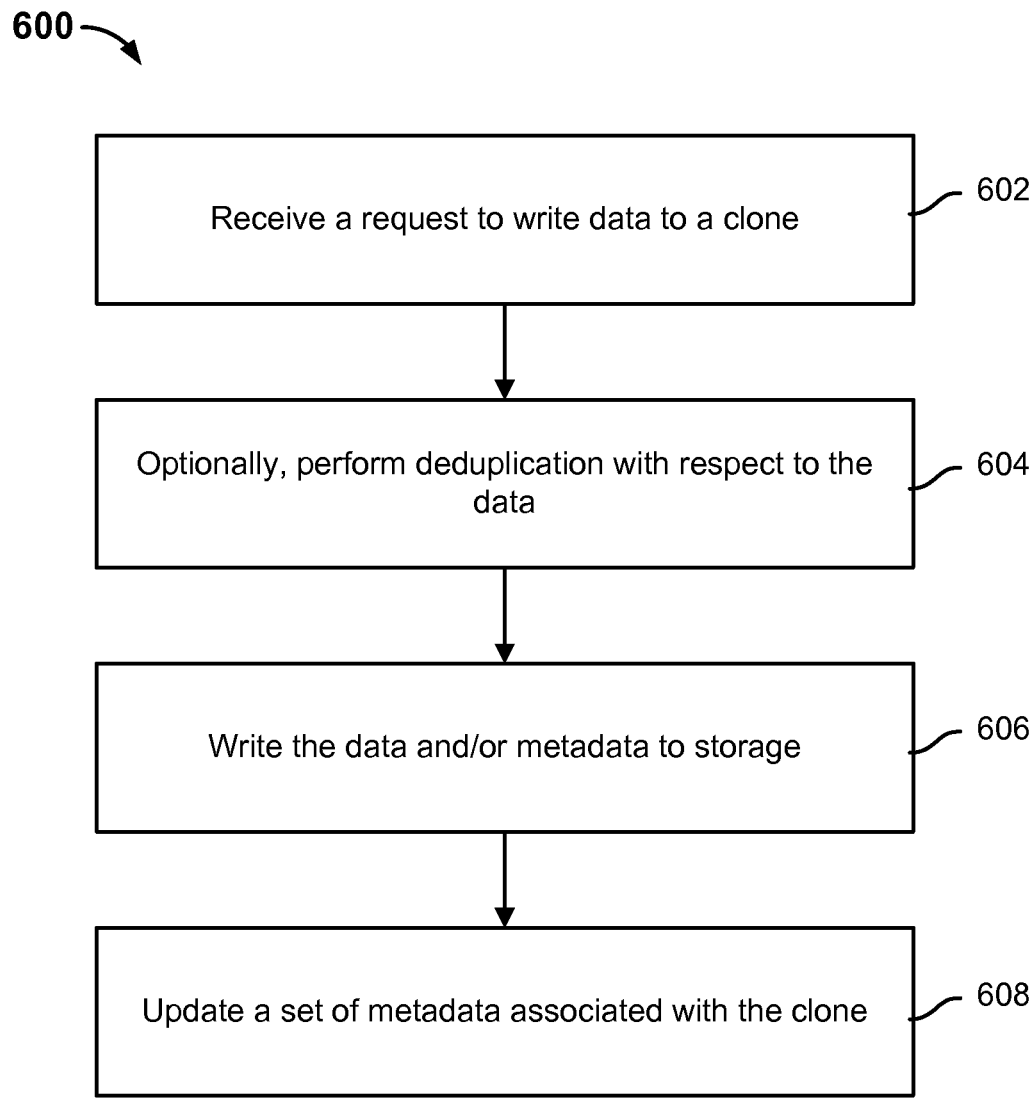
FIG. 6 is a flow diagram showing an embodiment of a process for performing a write operation to a clone.

FIG. 6 is a flow diagram showing an embodiment of a process for performing a write operation to a clone. In some embodiments, the process 600 is performed wholly or partly by a storage system and/or other processing system, for example, one configured to execute computer instructions that implement the steps of process 600.

At 602, a request to write data to a clone is received. At 604, optionally, deduplication with respect to the data is performed. In some embodiments, the data is deduplicated with data that is already stored at one or more tiers of storage. At 606, the data and/or metadata is written to storage. For example, if the data associated with the request is determined to be a duplicate of existing data, then metadata associated with the data (e.g., a reference to the existing data) is written to storage. Also, for example, if the data associated with the request is determined to not be a duplicate of existing data, then the data written to storage. The data may be written to one or more tiers of storage. For example, if the storage included two tiers, the first tier being the solid state disk (flash) storage and the second tier being the hard disk storage, then the data may be stored at the flash storage. At 608, a set of metadata associated with the clone is updated. The live index and the current snapshot index are both updated to reflect the physical location(s) (e.g., in flash) where the newly written or deduped data resides.

Figure 7:
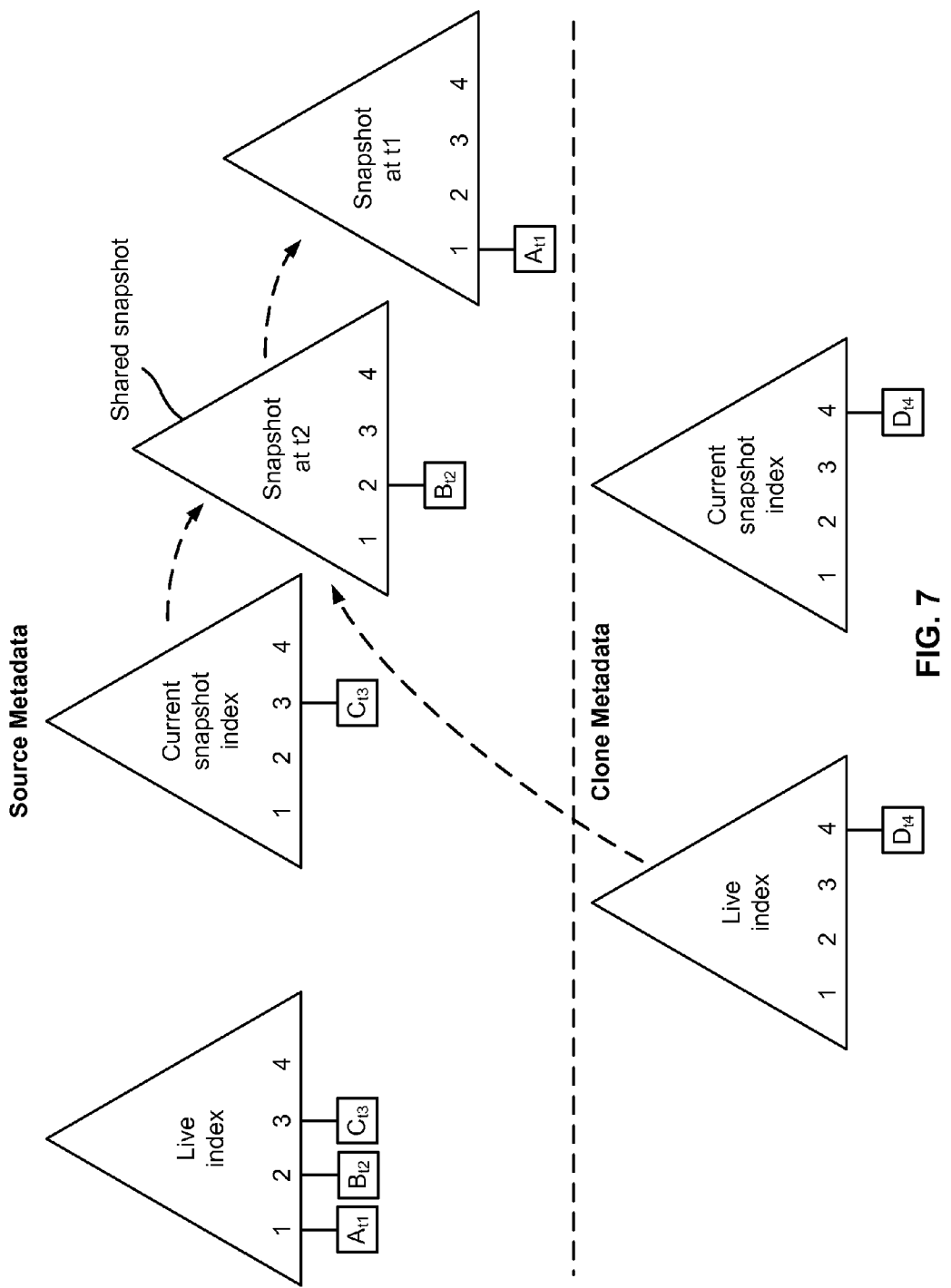
FIG. 7 is a diagram showing an example of updating the indices of a clone for a new write operation to the clone.

FIG. 7 is a diagram showing an example of updating the indices of a clone for a new write operation to the clone. In the example shown in FIG. 7, a new clone is created from the source data's snapshot at time t2, which includes data B. The shared snapshot, the snapshot at time t2, also links back to the oldest snapshot associated with the source data, the snapshot at time t1, which includes data A. After creating the clone, data D is written to the clone at location 4. The clone now includes data B and data A (via the pointer back to the shared snapshot of the source data), which it cloned from the source, and also data D, which was written to the clone after it was created. Note that the source data is not aware that data D has been written to the clone. Whereas the live index and the current snapshot index created for the clone are initially empty, subsequent to data D being written to the clone, both the live index and the current snapshot index are updated to reflect the location of the data D. The metadata of the source data is unaffected by new data being written to the clone. However, unlike write operations, read operations from the clone may traverse one or more snapshots of the source data, starting with the shared snapshot.

Figure 8:
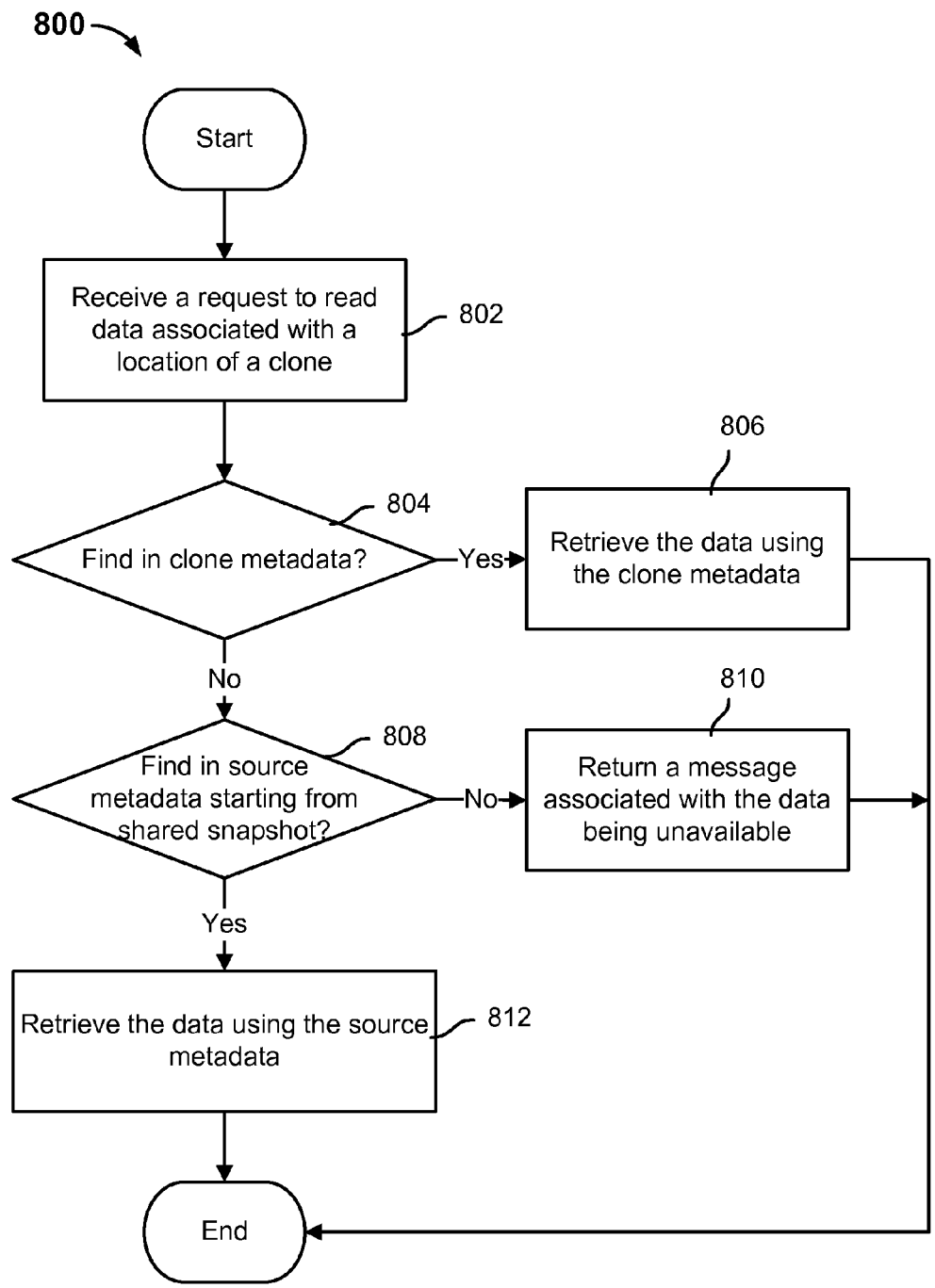
FIG. 8 is a flow diagram showing an embodiment of a process for performing a read operation from a clone.

FIG. 8 is a flow diagram showing an embodiment of a process for performing a read operation from a clone. In some embodiments, the process 800 is performed wholly or partly by a storage system and/or other processing system, for example, one configured to execute computer instructions that implement the steps of process 800.

In some embodiments, the process of reading data from clones is different from reading data from non-clones due to the fact that some of the clone's current (live) data may reside in a snapshot of the source data rather than the live index of the clone.

At 802, a request to read data associated with a location of a clone is received. At 804, it is determined whether the data associated with the request can be found in the live index associated with the clone. In the event that the mapping for the logical block offset of the requested data can be found in the clone's live index, then control is transferred to 806. Otherwise, in the event that the requested data cannot be found in the clone's live index, then control is transferred to 808. At 806, the data is retrieved using the clone metadata. If the clone's live index includes a mapping for the logical block offset of the requested data, then data is read from the corresponding physical address and returned. At 808, it is determined whether the requested data can be found in the source metadata starting from the shared snapshot. Typically, if a mapping for the logical block offset does not exist for a non-clone, then no additional index searching is required. However, because the read request is to a clone, if the mapping does not exist in the clone's live index, then the metadata of the source data is searched for the physical address of the requested data, starting with the shared snapshot in the source metadata. The stored data associating the clone's live index with the shared snapshot of the source data may be used to traverse to the shared snapshot from the clone's live index. As described above, the process of reading data from snapshots may involve traversing multiple snapshots backwards in time. Therefore, if the mapping to the requested data is not found in the shared snapshot of the source metadata, then the link to the next older snapshot is traversed and searched, and so forth. In the event that the mapping associated with the requested data can be found in the source's metadata, then control is transferred to 812. At 812, the data is retrieved using the source metadata. Otherwise, in the event that the requested data cannot be found in the source's metadata, then control is transferred to 810. If the oldest snapshot of the source metadata is searched and a mapping associated with the requested data cannot be found, then it is determined that the requested data cannot be found in the source metadata either. At 810, a message associated with the data being unavailable or, in some embodiments, a default data value, such as zeros, is returned.

To illustrate performing read operations on a clone, we return to FIG. 7. In a first example, assume that a read operation to the clone requests data associated with location 4. First, the live index of the clone is searched for a mapping to data associated with location 4. The mapping associated with location 4 is found in the clone's live index and so the search ends. Therefore, the mapping found in the clone's live index is used to service the read operation to the clone. In a second example, assume that a read operation to the clone requests data associated with location 1. First, the live index of the clone is searched for a mapping to data associated with location 1. The mapping is not found in the clone's live index, so the link (e.g., the stored associating data) from the clone's live index to the shared snapshot is traversed and a search of the shared snapshot, the snapshot at time t2, is performed. The mapping is not found in the shared snapshot, so the link from the shared snapshot to the next older snapshot, the snapshot at time t1, is traversed and a search of the snapshot at time t1 is performed. The mapping associated with location 1 is found in the snapshot at time t1 of the source data and so the search ends. Therefore, the mapping found in the snapshot at time t1 of the source data is used to service the read operation to the clone. As shown in the second example, metadata (e.g., snapshots) may be shared between a non-clone and its clone and therefore, in some instances, read operations to the clone may be serviced by metadata associated with the source data.

Snapshots may also be generated for a clone in the same manner that snapshots are generated for a non-clone. However, in some embodiments, whether a clone is associated with any snapshots will not affect read operations from the clone. Because the live index of the clone reflects the current state of data that was written to the clone, if a requested data cannot be located in the clone's live index, then it is determined that the requested data is also not included in the snapshot(s) of the clone. So, if the requested data cannot be found in the clone's live index, then the search proceeds directly from the clone's live index to the shared snapshot of the source data.

The live index of the clone may be thought of as a "partial" live index because it does not replicate the entries reachable from the shared snapshot index. As a result, the use of the "partial" live index results in very efficient sharing of metadata between clones and non-clones at the cost of additional lookups on read operations. Generally, the live index is used to service reads for the most recent or live copy of data while the snapshots are used to record the past history of data. Generally, the live index usually contains all live entries so that reads for the most recent copy of data can be satisfied solely from the live index without traversing other indices. The exception is for clones, where the live index is partial in the sense that it does not replicate the entries that are accessible starting from the shared snapshot. As a result, reads from a clone may require lookups in the live index first and then the shared snapshots if the desired data is not found in the clone's live index. The benefit of this is better sharing and less duplication of metadata. Sharing of metadata between clones and non-clones is also efficient because, often, not much source data is overwritten in the clone.

Figure 9:
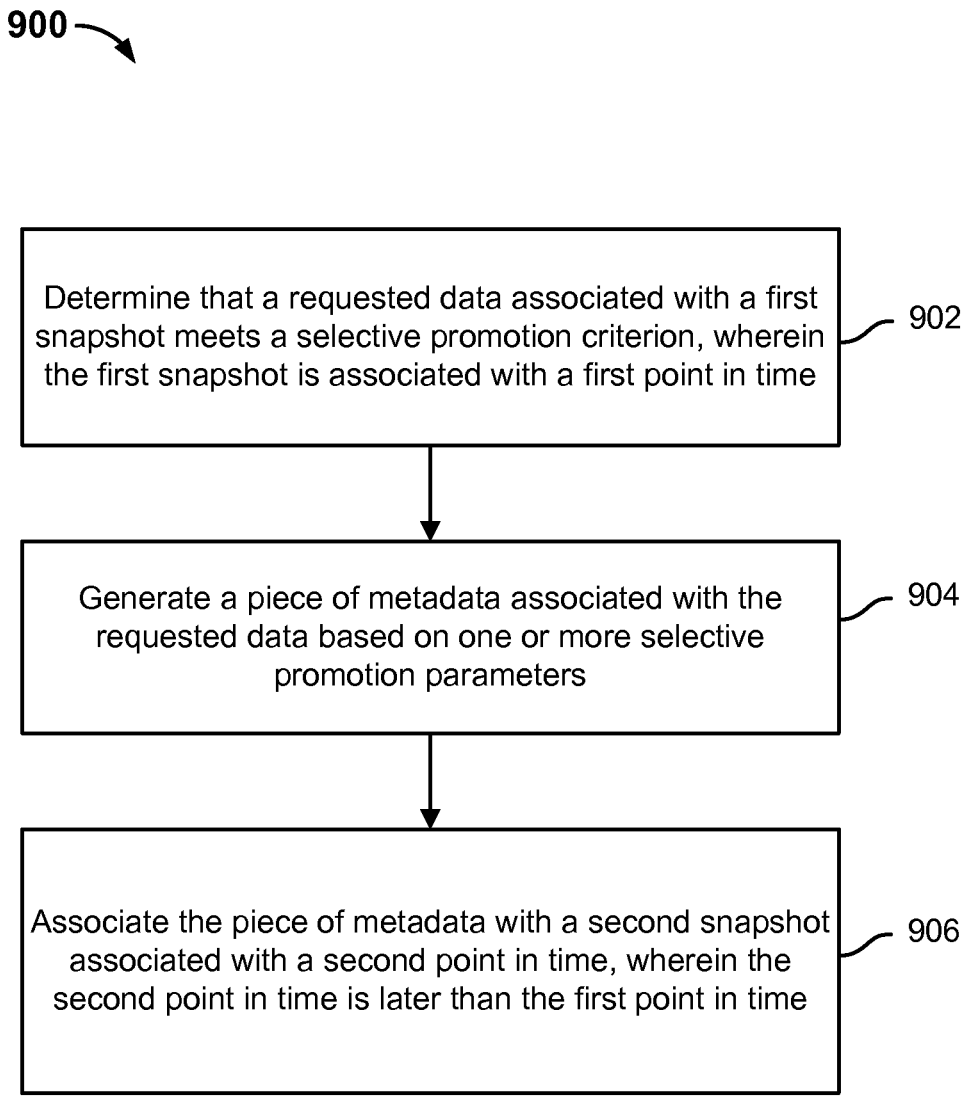
FIG. 9 is a flow diagram showing an example of selective promotion of data.

FIG. 9 is a flow diagram showing an example of selective promotion of data. In some embodiments, the process 900 is performed wholly or partly by a storage system and/or other processing system, for example, one configured to execute computer instructions that implement the steps of process 900.

To speed up the process of traversing snapshots backwards in time while searching for a particular logical to physical mapping, in some embodiments, metadata including data mappings may be selectively promoted (i.e., copied) from an older snapshot to a younger snapshot or to a live index of a clone. In various embodiments, "selective promotion" refers to adding a piece of metadata in a younger snapshot that references one or more mappings located in an older snapshot. Once this piece of metadata is added to the younger snapshot, then the next time that the data associated with the older snapshot is requested, a search for the data will end with this younger snapshot instead of needing to traverse to the older snapshot, which originally included the mapping to the requested data. As a result, selective promotion can significantly reduce the number of snapshots that need to be searched for a mapping to a requested data.

At 902, it is determined that a requested data associated with a first snapshot meets a selective promotion criterion, wherein the first snapshot is associated with a first point in time. As described above, when data is searched starting from a snapshot, in some instances, one or more snapshots in a series of snapshots are traversed backwards in time to find the snapshot that includes the appropriate mapping. However, such searching is costly in terms of both time and resources. Therefore, it would be desirable to determine whether a requested data (e.g., after the mapping to the requested data has been located in the appropriate snapshot) meets one or more criteria associated with selective promotion, and in the event that the data meets the criteria, to generate a piece of metadata that references the requested data (and/or the original mapping thereof) such that the piece of metadata may be subsequently used for quicker access to the requested data.

In various embodiments, various criteria associated with selective promotion may be configured by a user. For example, a selective promotion criterion may include the number of traversals (hops) needed to reach the snapshot with the mapping to the requested data (e.g., if it takes X hops through a series of snapshots needed to locate the snapshot that includes the mapping to the requested data, then the requested data is determined to be promoted).

At 904, a piece of metadata is associated with the requested data based on one or more selective promotion parameters. A set of one or more parameters associated with how selective promotion is to be performed for a requested data that is determined to be selectively promoted may also be configured by a user. For example, the selective promotion parameters may include one or more of the following: whether the piece of metadata to be generated to reference the requested data references the physical location of the data or an existing mapping (in a snapshot index) to the data; whether to promote only the mapping associated with the data that was previously requested or to promote the mappings associated with the data that was previously requested in addition to data that is in temporal locality, spatial locality, or grouped with the previously requested data based on another characteristic; whether the data should be promoted to a shared snapshot (that is younger than the snapshot that was determined to include the mapping to the data) or to a live index of a clone; and how long the requested data is to be promoted for. For example, the piece of metadata may comprise a pointer or other type of reference to the mapping or set of mappings to be promoted.

At 906, the piece of metadata is associated with a second snapshot associated with a second point in time, wherein the second point in time is later than the first point in time. The piece of metadata may be added to or otherwise associated with a younger snapshot because in a backwards in time search across snapshots, the younger snapshot would be searched before the older snapshot that included the original mapping to the requested data. Depending on the selective promotion parameters, the piece of metadata may be included in a younger snapshot that is a shared snapshot or a live index of a clone. An advantage of adding the piece of metadata associated with the promoted data to the shared snapshot is that the shared snapshot may be shared among multiple clones so that read operations to the promoted data could be improved for all those clones.

In some embodiments, the promotion can happen on demand or lazily in the background. As described above, promotion can promote individual mappings or a set of related mappings based on temporal locality, spatial locality, or some other metric or characteristic, for example. Promotion provides a much more flexible and efficient mechanism for improving searches than wholesale copy and modification of entire pages of metadata.

Figure 10:
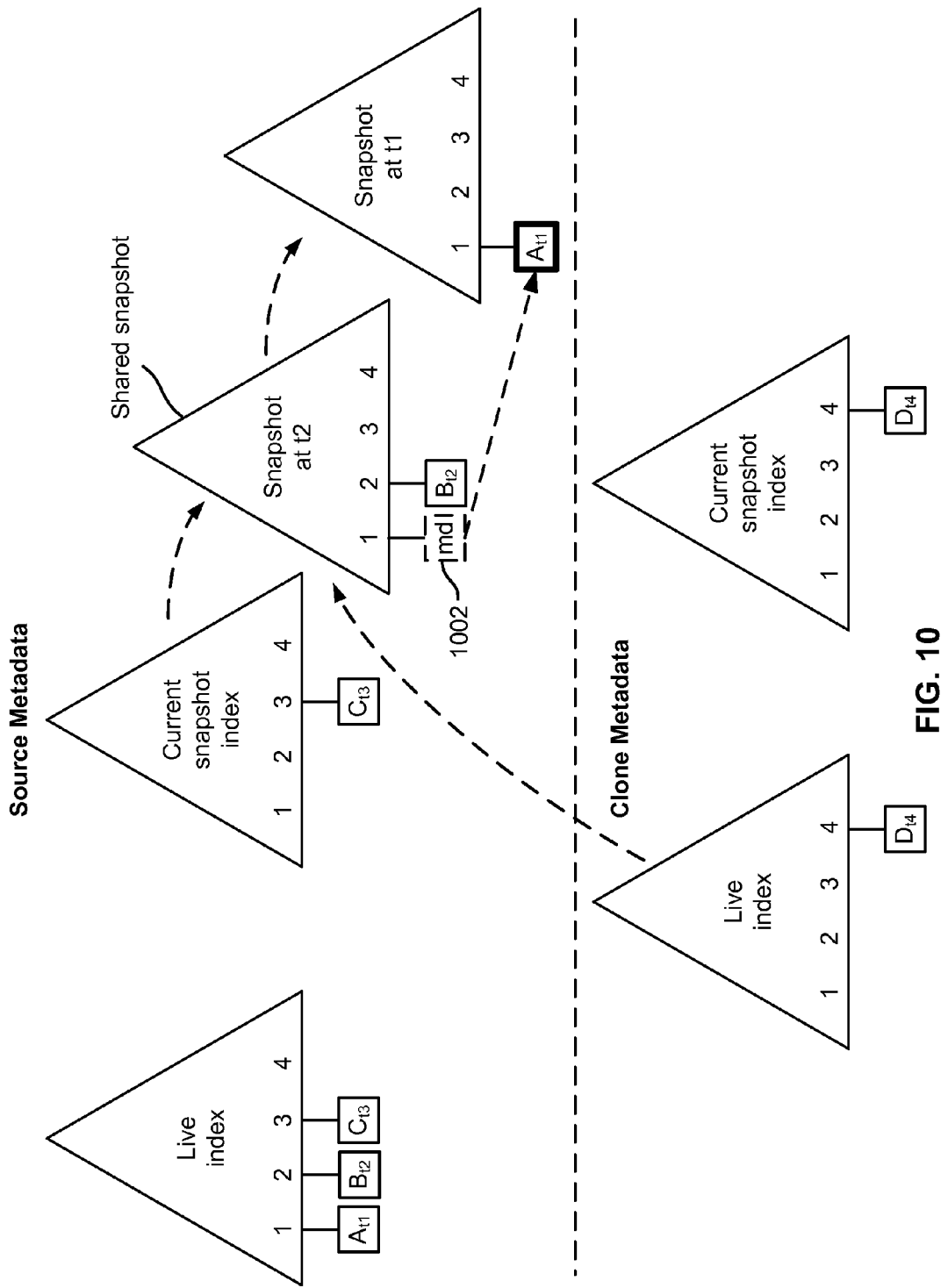
FIG. 10 is a diagram showing an example of selective promotion.

FIG. 10 is a diagram showing an example of selective promotion. In the example, a read operation for data associated with location 1 is received at the clone. First, a search of the clone's live index is performed. The mapping to the requested data cannot be located in the clone's live index and so the search proceeds to the shared snapshot, the snapshot at time t2, of the source data from which the clone was created. The mapping to the requested data cannot be located in the snapshot at time t2 and so the search proceeds to the next older snapshot, snapshot at time t1. The mapping to the requested data associated with location 1, data A, is found. The requested data associated with location 1 took two traversals (or hops) to reach from the clone's live index (clone's live index the shared snapshot (snapshot at time t2) snapshot at time t1). In the example, assume that the data associated with location 1, data A, meets a configured selective promotion criterion (e.g., the selective promotion criterion is that two or more hops are needed to reach the mapping associated with the requested data). In the example, the mapping to the data associated with location 1 is promoted by creating a piece of metadata 1002 that points to data A. Metadata 1002 is also added to the shared snapshot, the snapshot at time t2, such that a subsequent search for the data associated with location 1 can end after reaching the snapshot at time t2. If any clone created from the snapshot at time t2 subsequently searches for the data associated with location 1, only one hop (versus the original two hops, prior to the selective promotion) will be needed to locate the data (the one hop is from the clone's live index the shared snapshot (snapshot at time t2)). As shown in the example, by promoting the mapping to data A to the shared snapshot, the snapshot at time t2, all clones that are created from the shared snapshot may benefit in a subsequent search for the promoted mapping.

While the example in FIG. 10 shows promotion of a mapping to the shared snapshot, the parameters of selective promotion may alternatively be configured to cause the mapping to be promoted to the live index of the clone from which the data referenced by the mapping was previously requested. Also, while the example of FIG. 10 shows a piece of metadata 1002 pointing directly to data A, the parameters of selective promotion may alternatively be configured to cause the piece of metadata to point to a portion of the snapshot at time t1 associated with the original mapping to the data associated with location 1.

Another example of an optimization is as follows: when data is read from hard disk (e.g., a second tier storage) rather than flash (e.g., a first tier storage) after a successful search through the chain of snapshots, in some embodiments, the data may be written to flash and simultaneously promoted to a more recent or shared snapshot so that all clones that were created from the shared snapshot will benefit from this in-flash promoted data. This happens automatically because the metadata organization as disclosed allows most of the metadata and data to be shared between clones.

Figure 11:
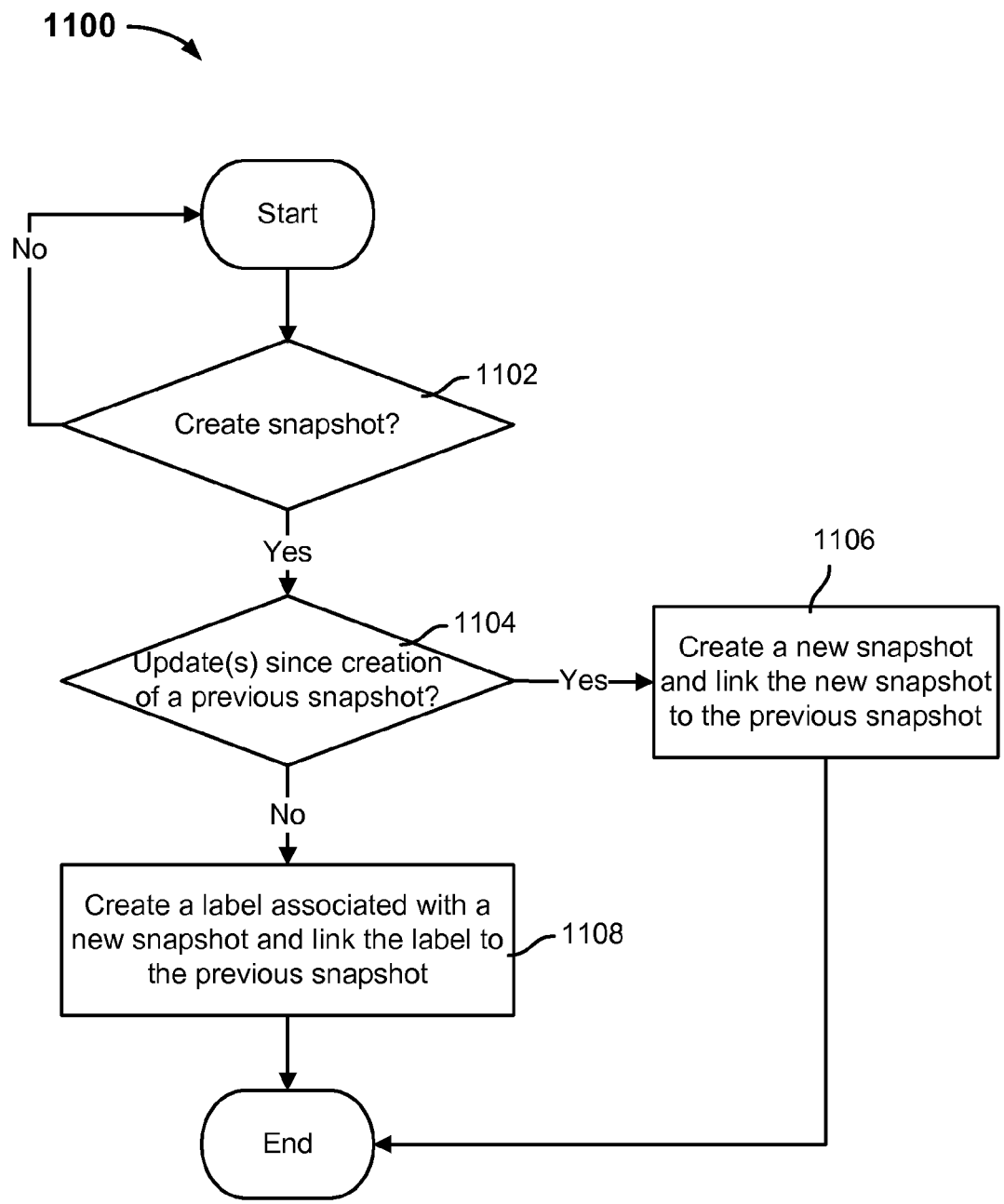
FIG. 11 is a flow diagram showing an embodiment of a process for reusing a snapshot.

FIG. 11 is a flow diagram showing an embodiment of a process for reusing a snapshot. In some embodiments, the process 1100 is performed wholly or partly by a storage system and/or other processing system, for example, one configured to execute computer instructions that implement the steps of process 1100.

In some embodiments, to further reduce snapshot space consumption, the most recent snapshot of a set of data is reused if it is determined that the set of data has not changed since the snapshot was created. Process 1100 shows an example of reusing a snapshot if the set of data (the set may be a clone or a non-clone) associated with the snapshot has not been updated by the time of the next prescribed snapshot creation event.

At 1102, it is determined whether a new snapshot for a set of data is to be created. For example, it is determined whether to create a new snapshot associated with the set of data at each prescribed snapshot creation event. The snapshot creation event(s) may be configured by a user. Examples of a snapshot creation event include an elapse of an interval of time, a receipt of a user selection to create a snapshot, and occurrence of a particular activity. In the event that a prescribed snapshot creation event has occurred, control is transferred to 1104. Otherwise, process 1100 begins again. At 1104, it is determined whether the set of data has been updated since creation of the previous snapshot. In the event that the set of data has been updated since the creation of the previous snapshot, then control is transferred to 1106. Otherwise, in the event that the set of data has not been updated since the creation of the previous snapshot, then control is transferred to 1108. It is determined whether any changes (e.g., new data is written to the set of data, existing data of the set of data is rewritten, changes to certain types of metadata) have occurred with respect to the set of data since the previous snapshot was created. At 1106, a new snapshot is created and linked to the previous snapshot. The changes to the set of data since the creation of the previous snapshot are captured in a newly created snapshot and this new snapshot is linked to the previous snapshot. In some embodiments, the new snapshot is created by preserving the current snapshot index associated with the set of data and creating a new empty current snapshot index to capture subsequent changes. At 1108, a label associated with a new snapshot is created and linked to the previous snapshot. Because no changes have been made to the set of data, the previous snapshot is reused instead of creating a new empty snapshot that does not include any mappings to changed/new data. In lieu of creating a new and empty snapshot, which would be unnecessary and space inefficient, a lighter weight piece of data such as, for example, a label is created. The label, in this case, serves as a second name and reference to the snapshot. The label does not include an index but rather a pointer or otherwise type of reference to the previous snapshot. The label takes the place of the new snapshot and when a search desires to search the snapshot, the search will instead be directed to the label, which will redirect the search to the previous snapshot.

Figure 12:
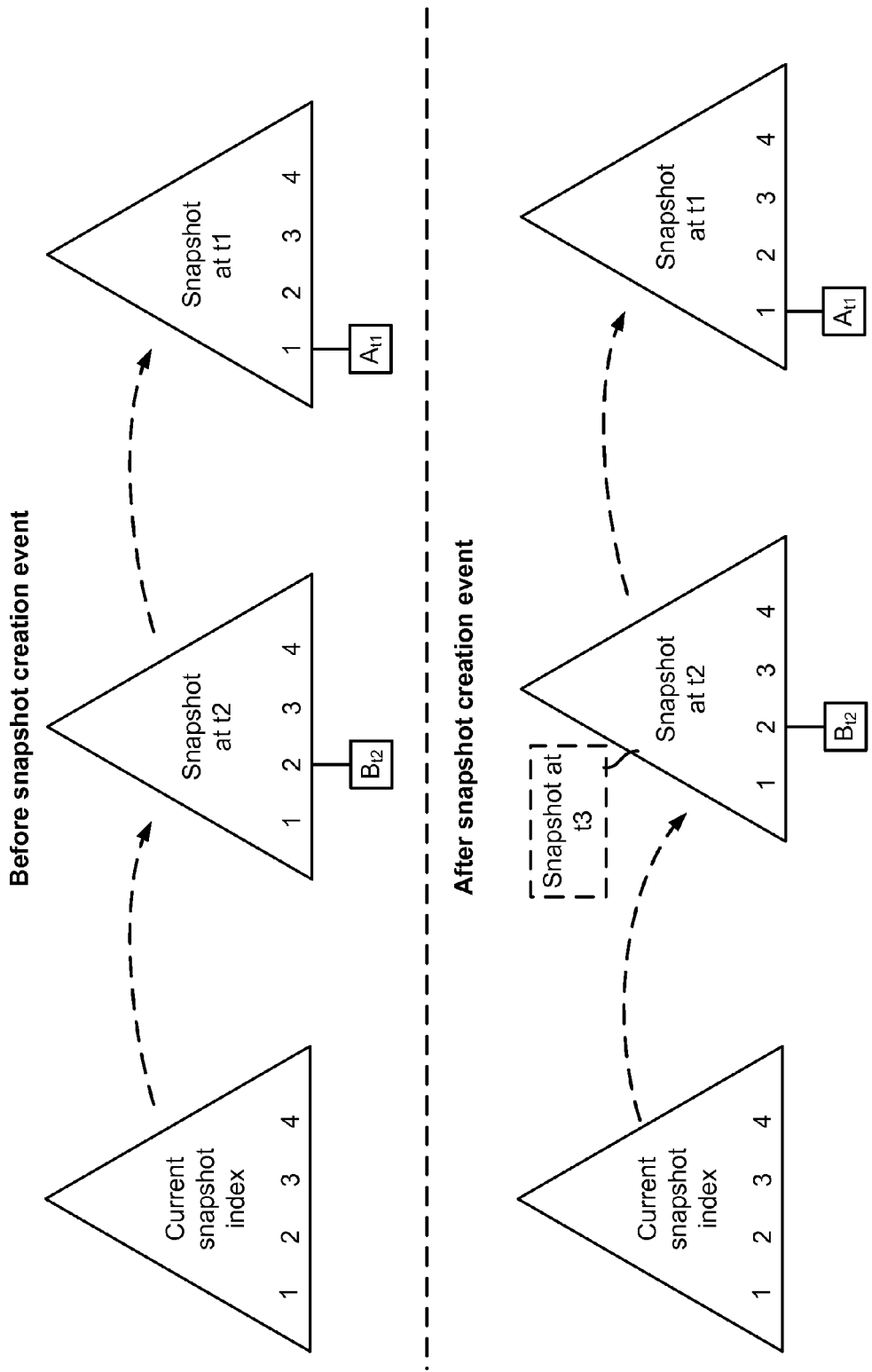
FIG. 12 is an example of reusing a snapshot.

FIG. 12 is an example of reusing a snapshot. The example shows a series of snapshots associated with a set of data before a snapshot creation event. Before the snapshot creation event, the current snapshot index is linked to the snapshot at time t2 and the snapshot at time t2 is linked to the snapshot at time t1. The current snapshot index remains empty when the next snapshot creation event occurs and, therefore, a new snapshot does not need to be created and the previously created snapshot, the snapshot at time t2, may be reused. Instead of creating a new empty snapshot at time t3, a label associated with the snapshot at time t3 is created instead, as shown in the second diagram associated with the system after the snapshot creation event. The current snapshot index remains linked to the snapshot at time t2. A subsequent search starting from snapshot at time t3 will actually start with the snapshot at time t2, to which the label refers.

Figure 13:
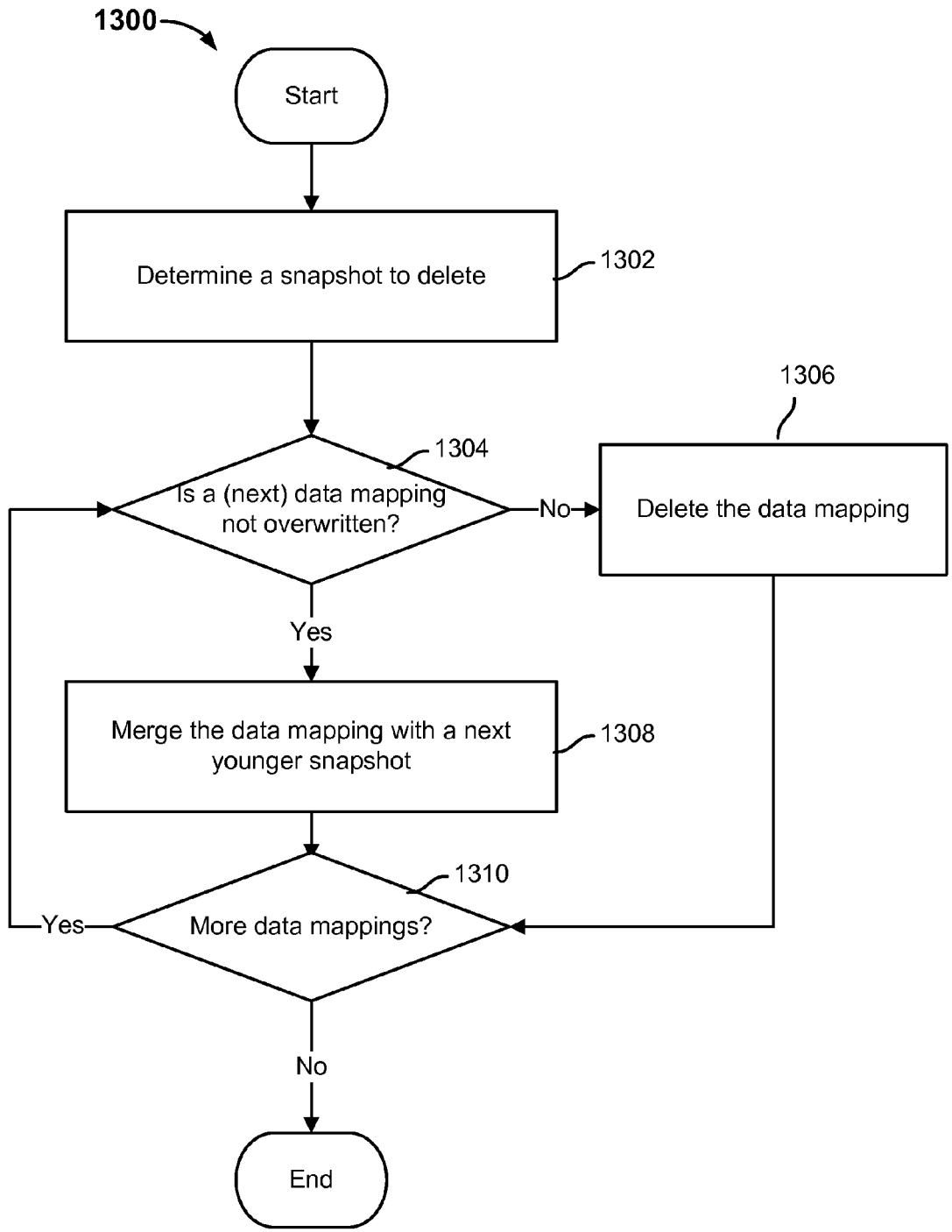
FIG. 13 is a flow diagram showing an embodiment of a process for deleting a snapshot.

FIG. 13 is a flow diagram showing an embodiment of a process for deleting a snapshot. In some embodiments, the process 1300 is performed wholly or partly by a storage system and/or other processing system, for example, one configured to execute computer instructions that implement the steps of process 1300.

In some embodiments, when a snapshot is deleted, a mapping to data that is overwritten in the next younger snapshot is also deleted. For example, suppose data is written to a file at a particular logical block offset, a snapshot is created, then the data at this same offset is overwritten. When the snapshot is eventually deleted, the overwritten data pointed to by the snapshot index will also be deleted. However, in some embodiments, if a snapshot index points to data that has not been overwritten, then deletion of this snapshot will cause the data to be transferred into the next younger snapshot.

At 1302, a snapshot to be deleted is determined. In some embodiments, a snapshot may be deleted if it meets one or more deletion criteria. Deletion criteria may be user configured. For example, deletion criteria may include one or more of the following: that the snapshot is associated with a reference count of zero (i.e., zero clones are currently sharing the mappings included in the snapshot) and that a prescribed deletion event has occurred. A deletion event may also be user configured. Examples of a deletion event may include an elapse of a time interval, a detection of low storage space remaining, and a receipt of a user selection to delete the snapshot. At 1304, it is determined for a (next) data mapping in the snapshot to be deleted whether data associated with the mapping has been overwritten in the next younger snapshot. In the event that data is overwritten, control is transferred to 1306. Otherwise, in the event that data is not overwritten, control is transferred to 1308.

At 1306, the data mapping associated with overwritten data is deleted. At 1308, the data mapping associated with not overwritten data is merged with the next younger snapshot. At 1310, it is determined whether there are more data mappings to consider in the snapshot to be deleted. In the event that there are still more data mappings to consider, control is returned to 1304. Otherwise, the process ends. Once all mappings to overwritten data have been deleted and all mappings to not overwritten data have been merged with the next younger snapshot, the snapshot itself may be deleted. If the snapshot being deleted was the oldest in a series, then the reference from the next younger snapshot to the snapshot being deleted is also deleted. If the snapshot was not the oldest in a series (i.e., there is at least one snapshot that is older), then the next younger snapshot to the snapshot being deleted is linked to the next older snapshot of the snapshot being deleted. If the deleted snapshot is the oldest of a clone, then the next younger snapshot is linked to the shared snapshot.

Snapshot deletion thus merges the logical-to-physical mappings from the index of the snapshot being deleted with that of its next younger snapshot. In various embodiments, merging may occur in either one of two directions based on the relative sizes of the two snapshot indices involved in the deletion and other metrics. The first direction is to merge the index of the snapshot being deleted into that of its next younger snapshot. Merging into the next younger snapshot includes merging the not overwritten data from the snapshot being deleted into the index of the next younger snapshot. The second direction is to superimpose the index of the next younger snapshot onto that of the snapshot being deleted. Superimposing into the snapshot being deleted includes merging the data from the next younger snapshot into the index of the snapshot being deleted (where overwritten data in the snapshot being deleted may be overwritten by data copied from the next younger snapshot). The end result of both of these mechanisms is identical. However, the superimposing method will result in faster deletion performance if the index of the next younger snapshot is significantly smaller than that of the snapshot being deleted. In some embodiments, the direction to transfer non-overwritten data of the snapshot being deleted to its next younger snapshot is determined dynamically during deletion based on the relative size of the snapshot being deleted and its next younger snapshot in a manner that preserves the larger of the two snapshots. For example, if the snapshot being deleted is larger than its next younger snapshot, then the index of the next younger snapshot is superimposed onto the index of the snapshot being deleted. Additionally, once the index of its next younger snapshot has been superimposed onto the index of the snapshot being deleted, the next younger snapshot is deleted and the snapshot being deleted is relabeled with the identity (e.g., name) of its next younger snapshot. Or for example, if the next younger snapshot is larger than its snapshot being deleted, then the index of the snapshot being deleted is merged into the index of the next younger snapshot and then the snapshot being deleted is deleted. Furthermore, once the index of the snapshot being deleted is merged with the index of the next younger snapshot and the snapshot is deleted, the link from the next younger snapshot to the snapshot being deleted is also deleted.

Figure 14:
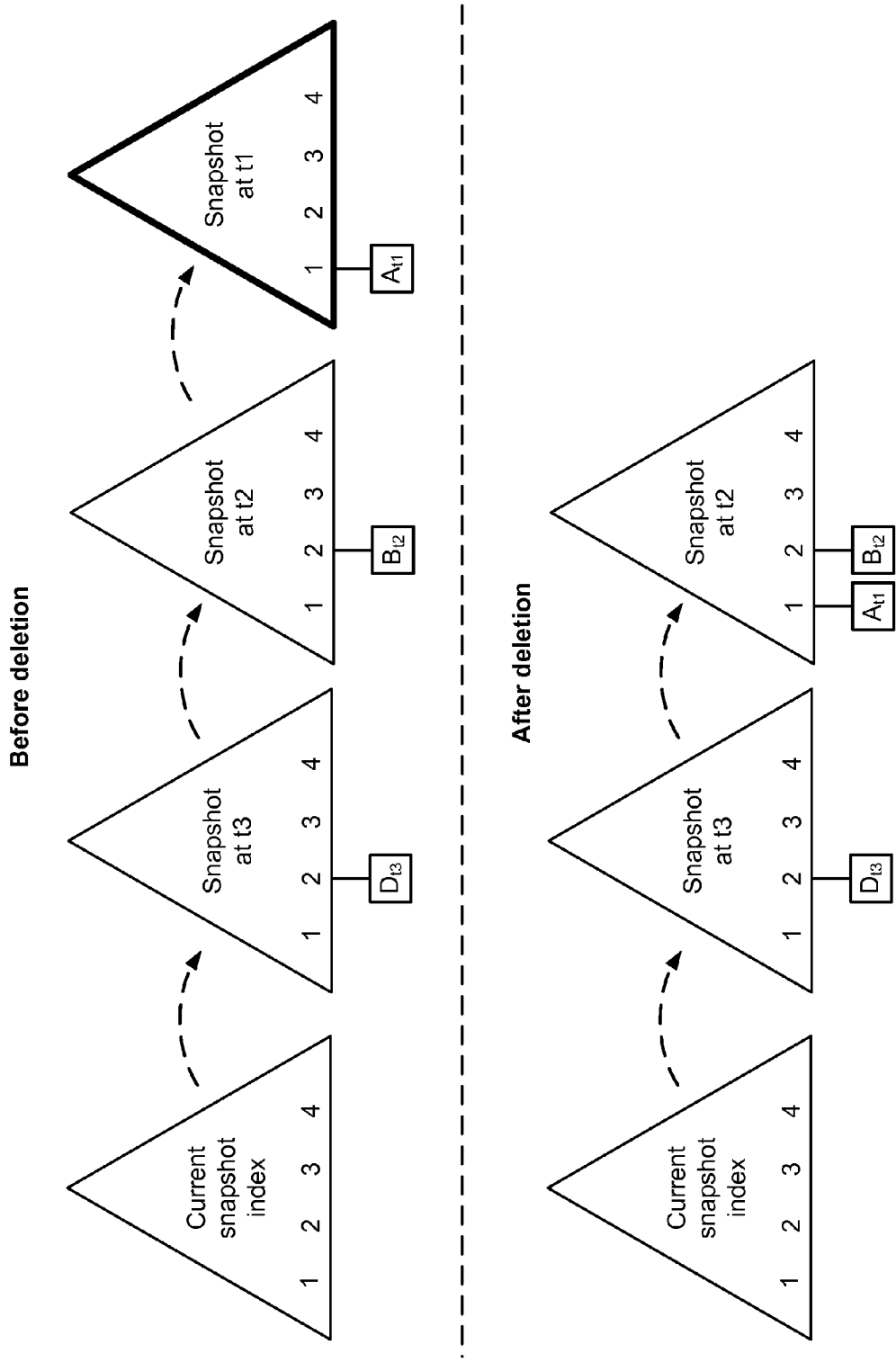
FIG. 14 is a diagram showing an example of deleting a snapshot.

FIG. 14 is a diagram showing an example of deleting the snapshot at time t1. If it is determined that the snapshot at time t1 is larger than the snapshot at time t2, then the index of the snapshot at time t2 is merged by superimposing onto the index of the snapshot at time t1 or if it is determined that the snapshot at time t2 is larger than the snapshot at time t1, then the index of the snapshot at time t1 is merged into the index at the snapshot at time t2. In either case, the snapshot at time t1 is deleted. In this example, the data associated with location 1 (data A) is not overwritten by the next younger snapshot at time t2. Therefore, regardless of the direction of the merge, data A associated with location 1 is preserved in the snapshot at time t2.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage system, comprising:
a processor configured to:
    receive a request to create a clone of a snapshot included in a first set of metadata associated with a source data;
    in response to the request to create the clone of the snapshot:
        generate a second set of metadata for the clone, wherein the second set of metadata associated with the clone includes, for at least some metadata values, a data associating with the second set of metadata one or more corresponding values in the first set of metadata associated with the source data,
        wherein the second set of metadata for the clone comprises a first active index and a second active index, wherein the first active index is configured to store one or more data values that are written to the clone since a creation of a previous snapshot associated with the clone, wherein the second active index is configured to store one or more data values that at least partially reflect a current state of the clone; and
        modify a stored reference clone value associated with the snapshot included in the first set of metadata associated with the source data, wherein the stored reference clone value is used to determine whether to delete the snapshot;
    receive a write operation to write a requested data value to the clone; and
    in response to the write operation, update the first active index and the second active index associated with the clone with the requested data value; and
a memory coupled to the processor and configured to store the first set of metadata and the second set of metadata.

2. The storage system of claim 1, wherein the processor is further configured to generate the data associating with the second set of metadata the one or more corresponding values in the first set of metadata.

3. The storage system of claim 1, wherein the requested data value comprises a first requested data value, and wherein the processor is further configured to:
    receive a read operation to read a second requested data value from the clone; and
    in response to the read operation, search the second set of metadata associated with the clone and in the event that the second requested data value is not found in the second set of metadata, search the snapshot included in the first set of metadata associated with the source data.

4. The storage system of claim 3, in the event the second requested data value is not found in the snapshot included in the first set of metadata associated with the source data, the snapshot comprises a first snapshot and wherein the processor is further configured to search a second snapshot included in the first set of metadata associated with the source data, the second snapshot being older than the first snapshot.

5. The storage system of claim 1, wherein the snapshot comprises a first snapshot and wherein the processor is further configured to:
    determine that requested data associated with a second snapshot meets a selective promotion criterion, wherein the second snapshot is older than the first snapshot;

generate a piece of metadata associated with the requested data based on one or more selective promotion parameters; and associate the piece of metadata with the first snapshot.

6. The storage system of claim 5, wherein the selective promotion parameters comprise one or more of the following: whether the piece of metadata to be generated to reference the requested data references a physical location of the requested data or an existing mapping to the requested data; whether to promote only mapping associated with the requested data that was previously requested or to promote mappings associated with the requested data that was previously requested in addition to data that is in temporal locality, spatial locality, or grouped with the requested data based on another characteristic; whether the requested data should be promoted to a shared snapshot or to a live index of the clone, and how long the requested data is to be promoted for.

7. The storage system of claim 1, wherein the processor is further configured to:
    determine that a snapshot creation event has occurred;
    determine that no changes have been made to the source data since creation of a previous snapshot associated with the source data;
    create a label associated with a new snapshot; and
    link the label associated with the new snapshot to the previous snapshot associated with the source data, wherein the label is configured to redirect a search of the new snapshot to the linked previous snapshot associated with the source data.

8. The storage system of claim 1, wherein the processor is further configured to:
    determine to delete a snapshot to be deleted; and
    merge a mapping of the snapshot to be deleted associated with not overwritten data with a next younger snapshot.

9. The storage system of claim 8, wherein whether the snapshot to be deleted is to be merged into the next younger snapshot or the next younger snapshot is to be superimposed onto the snapshot to be deleted is determined dynamically based on one or more criteria including on a first size associated with the snapshot to be deleted and a second size associated with the next younger snapshot.

10. The storage system of claim 1, wherein the second set of metadata associated with the clone does not replicate mappings included in the first set of metadata associated with the source data.

11. The system of claim 1, wherein the requested data value comprises a first requested data value, and wherein the processor is further configured to:
    receive a read operation to read a second requested data value from the clone; and
    in response to the read operation, search the second active index included in the second set of metadata associated with the clone for with the second requested data value.

12. The system of claim 11, wherein the processor is further configured to:
    in the event that a mapping associated with the second requested data value is found in the second active index included in the second set of metadata associated with the clone, return the second requested data value in the second active index.

13. The system of claim 11, wherein the processor is further configured to:
    in the event that a mapping associated with the second requested data value is not found in the second active index included in the second set of metadata, use the data associating with the second set of metadata one or more corresponding values in the first set of metadata to search the snapshot included in the first set of metadata associated with the source data for the mapping associated with the second requested data value.

14. A method for storage, comprising:
    receiving a request to create a clone of a snapshot included in a first set of metadata associated with a source data;
    in response to the request to create the clone of the snapshot:
        generating, by a processor, a second set of metadata for the clone, wherein the second set of metadata associated with the clone includes, for at least some metadata values, a data associating with the second set of metadata one or more corresponding values in the first set of metadata associated with the source data,
        wherein the second set of metadata for the clone comprises a first active index and a second active index, wherein the first active index is configured to store one or more data values that are written to the clone since a creation of a previous snapshot associated with the clone, wherein the second active index is configured to store one or more data values that at least partially reflect a current state of the clone; and
        modifying a stored reference clone value associated with the snapshot included in the first set of metadata associated with the source data, wherein the stored reference clone value is used to determine whether to delete the snapshot;
    receiving a write operation to write a requested data value to the clone; and
    in response to the write operation, updating the first active index and the second active index associated with the clone with the requested data value.

15. The method of claim 14, further comprising generating the data associating with the second set of metadata the one or more corresponding values in the first set of metadata.

16. The method of claim 14, wherein the requested data value comprises a first requested data value, and further comprising:
    receiving a read operation to read a second requested data value from the clone; and
    in response to the read operation, searching the second set of metadata associated with the clone and in the event that the second requested data value is not found in the second set of metadata, searching the snapshot included in the first set of metadata associated with the source data.

17. The method of claim 16, in the event the second requested data value is not found in the snapshot included in the first set of metadata associated with the source data, the snapshot comprises a first snapshot and further comprising searching a second snapshot included in the first set of metadata associated with the source data, the second snapshot being older than the first snapshot.

18. The method of claim 14, wherein the snapshot comprises a first snapshot and further comprising:
    determining that requested data associated with a second snapshot meets a selective promotion criterion, wherein the second snapshot is older than the first snapshot;
    generating a piece of metadata associated with the requested data based on one or more selective promotion parameters; and
    associating the piece of metadata with the first snapshot.

19. The method of claim 18, wherein the selective promotion parameters comprise one or more of the following: whether the piece of metadata to be generated to reference the requested data references a physical location of the requested data or an existing mapping to the requested data; whether to promote only mapping associated with the requested data that was previously requested or to promote mappings associated with the requested data that was previously requested in addition to data that is in temporal locality, spatial locality, or grouped with the requested data based on another characteristic; whether the requested data should be promoted to a shared snapshot or to a live index of the clone, and how long the requested data is to be promoted for.

20. The method of claim 14, further comprising:
determining that a snapshot creation event has occurred;
determining that no changes have been made to the source data since creation of a previous snapshot associated with the source data;
creating a label associated with a new snapshot; and
linking the label associated with the new snapshot to the previous snapshot associated with the source data, wherein the label is configured to redirect a search of the new snapshot to the linked previous snapshot associated with the source data.

21. The method of claim 14, further comprising:
determining to delete a snapshot to be deleted; and
merging a mapping of the snapshot to be deleted associated with not overwritten data with a next younger snapshot.

22. The method of claim 14, wherein the second set of metadata associated with the clone does not replicate mappings included in the first set of metadata associated with the source data.

23. A computer program product for storage, the computer program product being embodied in a non-transitory computer readable storage medium and comprising computer instructions for:
receiving a request to create a clone of a snapshot included in a first set of metadata associated with a source data;
in response to the request to create the clone of the snapshot:
generating a second set of metadata for the clone, wherein the second set of metadata associated with the clone includes, for at least some metadata values, a data associating with the second set of metadata one or more corresponding values in the first set of metadata associated with the source data,
wherein the second set of metadata for the clone comprises a first active index and a second active index, wherein the first active index is configured to store one or more data values that are written to the clone since a creation of a previous snapshot associated with the clone, wherein the second active index is configured to store one or more data values that at least partially reflect a current state of the clone; and
modifying a stored reference clone value associated with the snapshot included in the first set of metadata associated with the source data, wherein the stored reference clone value is used to determine whether to delete the snapshot;
receiving a write operation to write a requested data value to the clone; and
in response to the write operation, updating the first active index and the second active index associated with the clone with the requested data value.

* * * * *